US009653190B2

(12) United States Patent
Tanaka et al.

(10) Patent No.: US 9,653,190 B2
(45) Date of Patent: May 16, 2017

(54) REMOVAL DEVICE FOR RADIOACTIVE CESIUM

(71) Applicant: Taiheiyo Cement Corporation, Tokyo (JP)

(72) Inventors: Yoshihisa Tanaka, Chiba (JP); Tetsuo Ogiri, Tokyo (JP); Kenichi Honma, Chiba (JP); Soichiro Okamura, Tokyo (JP); Takuya Shindo, Tokyo (JP)

(73) Assignee: Taiheiyo Cement Corporation, Tokyo (JP)

( * ) Notice: Subject to any disclaimer, the term of this patent is extended or adjusted under 35 U.S.C. 154(b) by 287 days.

(21) Appl. No.: 14/412,664

(22) PCT Filed: Jun. 19, 2013

(86) PCT No.: PCT/JP2013/066807
§ 371 (c)(1),
(2) Date: Jan. 2, 2015

(87) PCT Pub. No.: WO2014/002843
PCT Pub. Date: Jan. 3, 2014

(65) Prior Publication Data
US 2015/0144038 A1    May 28, 2015

(30) Foreign Application Priority Data

Jun. 29, 2012  (JP) .................................. 2012-146249

(51) Int. Cl.
*G21F 9/32*        (2006.01)
*G21F 9/28*        (2006.01)
(Continued)

(52) U.S. Cl.
CPC .............. *G21F 9/32* (2013.01); *B09B 3/0083* (2013.01); *C04B 7/4423* (2013.01);
(Continued)

(58) Field of Classification Search
CPC ..... G21F 9/32; G21F 9/06; G21F 9/34; G21F 9/02; G21F 9/30; G21F 9/28;
(Continued)

(56) References Cited

U.S. PATENT DOCUMENTS 4,202,534 A  *  5/1980  Davis, Jr. ................ C21B 13/00
                                                      266/157
4,299,560 A  *  11/1981 Nakamura ................ F27B 7/42
                                                      432/106
(Continued)

FOREIGN PATENT DOCUMENTS

JP        5157897       6/1993
JP        10238729 A  *  9/1998 ............. F23G 5/033
(Continued)

OTHER PUBLICATIONS

English translation of Abstract for JP 10238729 A, Sep. 8, 1998.*
(Continued)

*Primary Examiner* — Regina M Yoo
(74) *Attorney, Agent, or Firm* — Stetina Brunda Garred and Brucker; Mark Garred

(57) ABSTRACT

To provide a device for removing radioactive cesium from waste material containing radioactive cesium, doing so at low energy and in a dependable manner. The removal device 1 for radioactive cesium is provided with: a rotary kiln 41 which is provided with a burner 41b supplying from the kiln outlet an organic matter O3 contaminated with radioactive cesium, and an inorganic matter charging port 41a supplying from the kiln inlet inorganic matter S4 contaminated with radioactive cesium, and which is employed to burn the organic matter O3 together with the inorganic matter S4; and a recovery device cooling tower 51, a cyclone 52, a bag filter 53 for recovering cesium that has volatilized in the rotary kiln. A drying/crushing device (dryer 21, crusher 22) for drying and crushing the organic matter O1 prior to charging (Continued)

the radioactive cesium-contaminated organic matter to the rotary kiln can be provided. Additionally, a reforming/drying/crushing device (reformer 31, dryer 32, crusher 23) for reforming, drying, and crushing the inorganic matter S1 can be provided. During burning of the organic matter O3 together with the inorganic matter S4, a calcium source can be added as a reaction accelerant A to the rotary kiln.

21 Claims, 1 Drawing Sheet

(51) Int. Cl.
| | |
|---|---|
| *G21F 9/30* | (2006.01) |
| *G21F 9/02* | (2006.01) |
| *F23G 5/027* | (2006.01) |
| *F23G 5/033* | (2006.01) |
| *F23G 5/04* | (2006.01) |
| *F23J 7/00* | (2006.01) |
| *G21F 9/34* | (2006.01) |
| *G21F 9/06* | (2006.01) |
| *B09B 3/00* | (2006.01) |
| *C04B 7/44* | (2006.01) |
| *B01D 53/50* | (2006.01) |
| *B01D 53/86* | (2006.01) |

(52) U.S. Cl.
CPC ........... *F23G 5/0276* (2013.01); *F23G 5/033* (2013.01); *F23G 5/04* (2013.01); *F23J 7/00* (2013.01); *G21F 9/02* (2013.01); *G21F 9/06* (2013.01); *G21F 9/28* (2013.01); *G21F 9/30* (2013.01); *G21F 9/34* (2013.01); *B01D 53/508* (2013.01); *B01D 53/8625* (2013.01); *B01D 2257/302* (2013.01); *B01D 2257/404* (2013.01); *B01D 2258/02* (2013.01); *Y02P 40/126* (2015.11)

(58) Field of Classification Search
CPC ....... C04B 7/4423; F23G 5/0276; F23G 5/04; F23G 5/033; F23J 7/00; B09B 3/0083
See application file for complete search history.

(56) References Cited

U.S. PATENT DOCUMENTS

| | | | | |
|---|---|---|---|---|
| 4,921,538 | A * | 5/1990 | Lafser, Jr. | B09C 1/067 |
| | | | | 106/286.6 |
| 5,662,050 | A | 9/1997 | Angelo, II et al. | |
| 5,732,365 | A | 3/1998 | Howard et al. | |
| 2005/0169613 | A1* | 8/2005 | Merrell | F26B 17/1416 |
| | | | | 392/386 |
| 2005/0194244 | A1* | 9/2005 | Merrell | B01J 6/004 |
| | | | | 202/105 |
| 2008/0253956 | A1* | 10/2008 | Rossi | C04B 2/06 |
| | | | | 423/438 |
| 2008/0292512 | A1* | 11/2008 | Kang | B01D 53/10 |
| | | | | 422/172 |
| 2012/0200092 | A1* | 8/2012 | Johnson | F26B 23/028 |
| | | | | 290/1 R |
| 2013/0168295 | A1* | 7/2013 | Euston | C10B 57/06 |
| | | | | 208/435 |
| 2014/0141381 | A1* | 5/2014 | Bullinger | C10L 9/08 |
| | | | | 432/29 |

FOREIGN PATENT DOCUMENTS

| | | |
|---|---|---|
| JP | 2001235595 | 8/2001 |
| JP | 2006272205 A | 10/2006 |

OTHER PUBLICATIONS

Extended European Search Report for EP 13 81 0086 mailed on Feb. 5, 2016.
International Search Report and Written Opinion for PCT/JP2013/066807 issued Aug. 6, 2013.

* cited by examiner

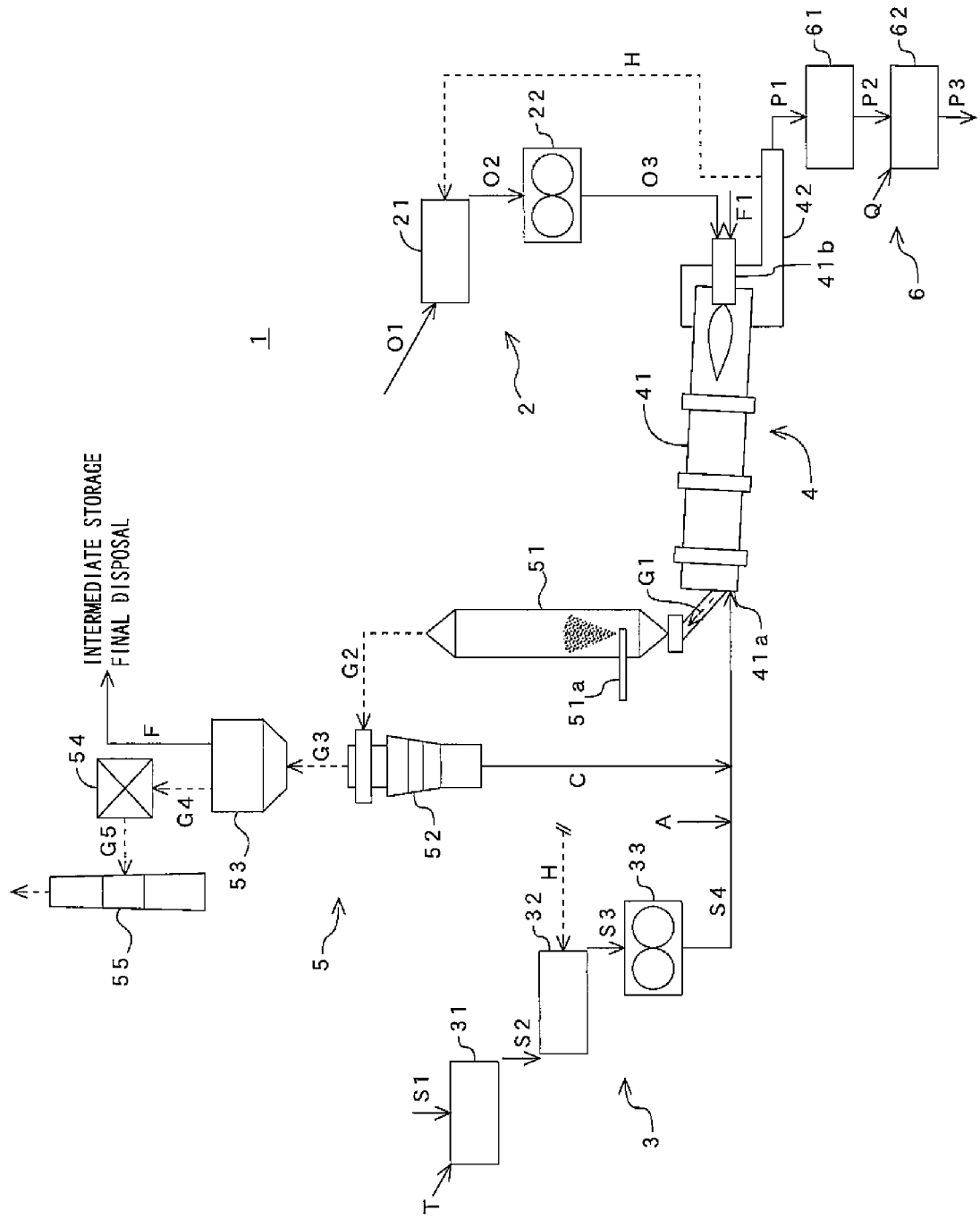

REMOVAL DEVICE FOR RADIOACTIVE CESIUM

CROSS-REFERENCE TO RELATED APPLICATIONS

The present application claims priority to International Application No. PCT/JP2013/0669807 filed on Jun. 19, 2013, which claims priority to Japanese Patent Application No. 2012-146249 filed Jun. 29, 2012.

STATEMENT RE: FEDERALLY SPONSORED RESEARCH/DEVELOPMENT

Not Applicable

BACKGROUND OF THE INVENTION

1. Technical Field of the Invention

The present invention relates to a device for removing radioactive cesium from waste containing radioactive cesium, more specifically from organic waste such as sewage sludge, branches and leaves.

2. Description of the Related Art

A variety of proposals have been made on means and apparatus for decontaminating radioactive material from waste containing radioactive material such as radioactive cesium. For example, in the patent document 1 is disclosed a method of melting radioactive waste produced by nuclear fission that exists in a form of nitrate thorough electromagnetic induction heating in a cooling container with slits and a turning-on-electricity coil wounded on the outside of the container; volatilizing long-lived nuclides such as cesium; and separating and collecting the volatilized long-lived nuclides.

Patent Document 1: Japanese Patent Publication No. Heisei 5-157897 gazette.

However, an issue that is produced in our country according to the accident of the nuclear power plant of this time and that should be solved is not carrying out decontamination of a waste generated by usual operation in nuclear related facilities, which is described in the above-mentioned patent document 1, but carrying out decontamination of radioactive materials that were emitted to the external world and incorporated into soil, sewage sludge, wood, etc. Since attaining to a huge quantity of such radioactive waste is expected, it is important to offer, not a proposal of a mere decontamination means, but a means for efficiently carrying out volatilization removal and collection of radioactive materials in large quantities to reduce costs for the processes.

Therefore, this invention has been made in view of the above-mentioned problems to be solved, and the object thereof is to provide a device for certainly removing radioactive cesium from waste containing radioactive cesium with lower energy consumption.

BRIEF SUMMARY OF THE INVENTION

In order to attain the above-mentioned object, this invention relates to a removal device for radioactive cesium, and the device is characterized by comprising: organic matter supplying means for supplying an organic matter contaminated with radioactive cesium from a kiln outlet; inorganic matter supplying means for supplying an inorganic matter contaminated with radioactive cesium from a kiln inlet; a rotary kiln for burning the organic matter together with the inorganic matter; and a recovery device for recovering cesium volatilizing in the rotary kiln.

Then, with the present invention, supplying the organic matter contaminated with radioactive cesium from a kiln outlet allows the organic matter to substitute for a part of fuel, resulting in reduced fuel cost. In addition, the organic and inorganic matters that are contaminated with radioactive cesium can be treated at high temperatures in the rotary kiln, so that the radioactive cesium can be volatilized and removed.

Further, supplying the organic matter from the kiln outlet and burning it while causing it to pass through a high temperature portion of the rotary kiln allows the cesium to securely be vaporized, and to be transported to the kiln inlet by air current and removed. And, generations of unburnt carbon, carbon monoxide and so on are suppressed, and odor components generated from sewage sludge and others can be decomposed. As a result, additional devices for exhaust gas treatment can be omitted. Further, supplying the inorganic matter from the kiln inlet allows sensible heat due to combustion of the organic matter to effectively be utilized, resulting in efficient burning.

Here, the organic matters contaminated with radioactive cesium are sewage sludge, sewage sludge dry powder/carbide, water purification sludge, construction sludge, pruning branches and leaves, weeding dry matter, earthquake waste wood, vegetation of water sediment in lakes etc., and the inorganic matters contaminated with radioactive cesium are sewage slag, soil, municipal waste incineration ash, various sludge incineration ashes, rubble, water sediment in lakes etc.

The above removal device for radioactive cesium can further comprise a drying/crushing device for drying and crushing the organic matter contaminated with radioactive cesium before thrown into the rotary kiln. With this, sewage sludge and so on, which cause large heat loss so that utilization thereof has not been promoted, can be utilized as an alternative fuel, and radioactive cesium included in the organic matter can securely be treated also.

The above removal device for radioactive cesium may further comprise a reformer for reforming the inorganic matter contaminated with radioactive cesium, and further a drying/crushing device for drying and crushing the inorganic matter before thrown into the rotary kiln. The reforming allows poor handleability such as adhesion of inorganic matters including water to storage tanks, transporters and so on to be improved, which causes transportation to driers and the like disposed downstream to be carried out with ease. In addition, the drying eliminates the need for heat consumed for evaporation of water in the inorganic matter in the rotary kiln, resulting in reduced fuel usage. At the same time, the quantity of exhaust gas from the rotary kiln is reduced, so that exhaust gas treatment devices such as a cooling tower, a cyclone, a dust collector and a denitrification scrubber can be made compact, which can reduce facility cost also. Further, the crushing allows quality such as concentration of the radioactive cesium of the inorganic matter to be uniform, so that it becomes possible to stably and securely treat radioactive cesium in the rotary kiln.

In the above removal device for radioactive cesium, the recovery device may include a cooling tower for cooling an exhaust gas from the rotary kiln, and a dust collector for collecting dust in an exhaust gas from the cooling tower.

The removal device for radioactive cesium may further comprise a classifier, in a fore stage of the dust collector, for separating a coarse dust in the exhaust gas from the cooling tower, wherein the coarse dust separated by the classifier is returned to the rotary kiln. With this construction, collecting only fine dust containing much radioactive cesium allows radioactive cesium to efficiently be recovered.

In the above removal device for radioactive cesium, a calcium source can be added in the rotary kiln when the organic matter contaminated with radioactive cesium is burnt together with the inorganic matter contaminated with radioactive cesium. With this, basicity of a burnt material is increased, and generation of liquid phase in burning process can be suppressed, resulting in efficient volatilization of the radioactive cesium.

The removal device for radioactive cesium may further comprise a separator for separating a decontaminated product generated after radioactive cesium is volatilized and removed in the rotary kiln; and an insolubilizing material supplying/mixing device for supplying an insolubilizing material to the decontaminated product and mixing them. With this construction, it becomes possible to adjust the decontaminated product to have suitable particle sizes for cement admixtures and earthwork materials. In addition, elution of heavy metals and others from the decontaminated product can be prevented, so that the decontaminated product can effectively be used.

As described above, with the present invention, it is possible to provide a device for certainly removing radioactive cesium from waste containing radioactive cesium with lower energy consumption.

BRIEF DESCRIPTION OF THE DRAWINGS

FIGURE depicts the overall structure of a removal device for radioactive cesium according to an embodiment of the present invention.

DETAILED DESCRIPTION OF THE INVENTION

Next, an embodiment carrying out the present invention will be explained in detail with reference to FIGURE. In the following explanation, with a removal device for radioactive cesium of the present invention, while removing radioactive cesiums from organic and inorganic matters containing radioactive cesium, decontaminated products that can be used for cement additives, earthwork materials and so on are produced from the organic and inorganic matters after decontamination as an example. Here, radioactive cesiums include cesium 134 and cesium 137 that are radioactive isotopes of cesium.

FIGURE shows a radioactive cesium removal apparatus according to an embodiment of the present invention, and the removal apparatus 1 is roughly divided and provided with an organic matter drying/crushing device 2, an inorganic matter reforming/drying/crushing device 3, a burning device 4, a decontamination system exhaust gas treatment device 5 and a decontaminated product separator 6.

The organic matter drying/crushing device 2 is disposed in a fore stage of the burning device 4 to dry and crush a received organic matter including radioactive cesium (hereinafter referred to as simply "organic matter") O1, and is composed of a dryer 21 and a crusher 22.

The dryer 21 is installed to dry the received organic matter O1 when its water content is high from a view point of heat efficiency. The crusher 22 is installed in a rear stage of the dryer 21 to crush an organic matter O2 dried in the dryer 21 to appropriate sizes so as to be blown from a burner 41b at an outlet of the rotary kiln 41. Here, the organic matter O1 brought into the organic matter drying/crushing device 2 is, as described above, sewage sludge, trimmed tree material, weed, rice straw and so on including radioactive cesium with a variety of characteristics including water content and shape. Therefore, when improvement in characteristics and so on are not needed, one of the dryer 21 and the crusher 22 or the both of them can be omitted. In addition, a drying/crushing device with drying and crushing functions may be installed.

The inorganic matter reforming/drying/crushing device 3 is installed in a fore stage of the burning device 4 to reform, dry and crush a received inorganic matter (hereinafter referred to as simply "inorganic matter") S1, and is composed of a reformer 31, a dryer 32 and a crusher 33.

The reformer 31 is installed to reform handleability of the received inorganic matter S1 by adding a reformer T to the inorganic matter S1 when the handleability of the inorganic matter S1 is poor, for instance, the inorganic matter S1 adheres to storage tanks, transporters or the like. With this, transportation to the dryer 32 and others, which are installed in a rear stage becomes easy. As the reformer T is used quicklime, slaked lime, calcium carbonate, cement and so on, and one of them alone or more than one of them can be used. Among them, quicklime is preferable in reforming effects and cost.

The dryer 32 is disposed in a rear stage of the reformer 31 to dry the inorganic matter S2 from a view point of reduction in input heat quantity in the rotary kiln 41 when water content of the inorganic matter S2 after the reformation is high.

The crusher 33 is disposed in a rear stage of the dryer 32 to crush an inorganic matter S3, which is dried in the dryer 32, into appropriate sizes to equalize quality such as concentration of radioactive cesium.

Here, the inorganic matter S1 brought into the inorganic matter reforming/drying/crushing device 3 is, as described above, slag, soil, various sludge incineration ashes, rubble, water sediment in lakes and so on including radioactive cesium with a variety of characteristics including water content and shape. Therefore, when improvement in characteristics and so on are not needed, one of the reformer 31, the dryer 32 and the crusher 33 or all of them can be omitted. And, a device with at least two functions in deforming, drying and crushing can be installed.

The burning device 4 is installed to burn an organic matter O3, which is dried and crushed in the organic matter drying/crushing device 2, and is composed of a rotary kiln 41 and a clinker cooler 42.

The rotary kiln 41 is provided with an inorganic matter charging port 41a for feeding an inorganic matter S4, which is reformed, dried and crushed in the inorganic matter reforming/drying/crushing device 3, at the kiln inlet, and a burner 41b at the kiln outlet to eject a fossil fuel F1 such as pulverized coal and the above organic matter O3 to burn the fed matters.

The clinker cooler 42 is installed to cool the burnt matter discharged from the rotary kiln 41 with a cooling air (atmosphere) introduced and to obtain a decontaminated product P1. The high-temperature extracted gas H from the clinker cooler 42 is fed to the dryer 21 for the organic matter and the dryer 32 for the inorganic matter, and is used for drying the organic matter O1 and the inorganic matter S2.

The decontamination system exhaust gas treatment device 5 is disposed in a rear stage of the burning device 4 and is composed of a cooling tower 51 for cooling an exhaust gas G1 from the rotary kiln 41; a cyclone 52 for collecting a coarse dust C included in an exhaust gas G2 of the cooling tower 51; a bag filter 53 for collecting a fine dust F included in an exhaust gas G3 of the cyclone 52; and a denitrification scrubber 54 for denitrifying an exhaust gas G4 of the bag filter 53.

The cooling tower 51 is installed to cool the exhaust gas G1 from the rotary kiln 41 and recover radioactive cesium and others, which are volatilized from the organic matter O3 and the inorganic matter S4, in a solid state. The cooling of the exhaust gas G1 is carried out by spraying water from a water spray device 51a mounted at a lower end portion of the cooling tower 51. In this connection, it is sufficient that the water spray device 51a has a function to an extent that volatilized cesium can be recovered in a solid state by adhering it to a dust contained in the exhaust gas G1, and the position that the water spray device 51a is installed is not limited to a lower end portion of the cooling tower 51. In addition, in place of cooling with water, cooling air may be introduced into the cooling tower for the cooling, the cooling with water and the cooling with air can separately be performed or the both may simultaneously be carried out.

The cyclone 52 is installed to recover the coarse dust C including cesium salt concentrated in the manner described above, and the recovered coarse dust C is thrown into the rotary kiln 41 from the charging port 41a together with the inorganic matter S4. In place of the cyclone 52, other type of separator may be used.

The bag filter 53 is installed to recover the fine dust F adsorbing cesium salt, acid gases and others contained in the exhaust gas G3 from the cyclone 52. In place of the bag filter 53, other type of collector can be used. In addition, two bag filters may be installed in series; a front stage bag filter can recover the fine dust F adsorbing cesium salt; and in a rear stage bag filter can be added an exhaust gas treatment agent for removing the acid gases and others to recover dust adsorbing the acid gases and others.

The denitrification scrubber 54 is installed to decompose and remove, with catalysis or the like, NOx in the combustion exhaust gas G4 that passes though the bag filter 53. This denitrification scrubber 54 is, for example, constructed as honeycomb shaped, so that the scrubber 54 can be constructed to comparatively be small even when a large amount of combustion exhaust gas is treated. In addition, not only decomposing and removing NOx, a function of adsorbing and removing SOx can be added thereto.

The decontaminated product separator 6 is installed in a rear stage of the burning device 4 to separate clinker (decontaminated product) P1, which can be used as an earthwork materials etc., and further add and mix an insolubilizing material Q. The decontaminated product separator 6 is composed of the separator 61 and the insolubilizing material supplying/mixing device 62.

The separator 61 is installed to adjust the decontaminated product P1 to suitable particle sizes for cement admixtures, earthwork materials etc. (hereinafter referred to as simply "earthwork materials etc.") P3. Here, the particle size of the decontaminated product P1 varies in accordance with combustion conditions such as combustion temperature and staying time in the burning device 4. When the particle size of the decontaminated product P1 becomes suitable for those of earthwork materials etc., the separator 61 may be omitted. Further, only separation is not enough to obtain suitable particle sizes as earthwork materials etc. P3, a crusher may be installed in a fore stage of the separator 61, or separators and crushers can be installed in plural.

The insolubilizing material supplying/mixing device 62 is disposed in a rear stage of the separator 61, and when heavy metals, hexavalent chrome, fluorine and the like dissolve from a separated decontaminated product P2, with the object of preventing it, the device 62 is installed to add an insolubilizing material Q to the decontaminated product P2 and mix them. As the insolubilizing material Q can be used at least one selected from the group consisting of reducing agents and adsorbents. For example, the reducing agents include subsulfate such as sodium sulfite, ferrous salt such as ferric sulfate (II), ferric chloride (II), sodium subsulfite, iron powder etc. The adsorbents include, for example, zeolite, clay mineral, layered double hydroxide like hydrotalcite compounds such as Mg—Al system and Mg—Fe system, Ca—Al based compounds such as Ca—Al based oxide, ettringite and monosulphate, aqueous oxide such as ferric oxide (hematite) and bismuth oxide, magnesium compounds such as magnesium hydroxide, light-burnt magnesium, burnt dolomite and magnesium oxide, iron compounds such as ferric sulfide, iron powder, schwertmannite and FeOOH, mixture or burnt material of one, two or more of silicium oxide, aluminum oxide ferric oxide and the like, cerium and compounds including rare earth. One of the reducing agent and the adsorbent can be used solely, and two or more of them can be used in combination. Here, amount of heavy metals etc. dissolved from the decontaminated product P2 differs depending on amount and form of the heavy metals etc. included in the organic matter O3 and the inorganic matter S4 that are fed to the burning device 4. Therefore, when the amount of dissolved heavy metal etc. is below standards of earthwork materials etc., this can be omitted.

Next, the motion of the removal device for radioactive cesium 1 with the above-mentioned construction will be explained with reference to FIGURE 1.

After the received organic matter O1 is thrown into the dryer 21 to dry it, the dried organic matter O2 is thrown into the crusher 22 to crush it to desired sizes.

On the other hand, to the received inorganic matter S1 is supplied the reformer T to reform it in the reformer 31, and the reformed inorganic matter S2 is thrown into the dryer 32 to dry it, and further, the dried inorganic matter S3 is thrown into the crusher 33 to crush it to desired sizes.

The dried/crushed organic matter O3 and the fossil fuel F1 are blown from the burner 41b into the rotary kiln 41 to burn them, and the reformed/dried/crushed inorganic matter S4 and a calcium source as the reaction accelerant A are thrown from the charging port 41a to burn them. Supplying the reaction accelerant A increases basicity of a burnt material, which can suppress generation of liquid phase in burning process, resulting in efficient volatilization of radioactive cesiums included in the organic matter O3 and the inorganic matter S4.

As the calcium source, calcium carbonate, quicklime, slaked lime, limestone, dolomite, blast furnace slag and the like can be used, and one selected from this group can be used solely, or two or more selected from this group can be used in combination. Among them, calcium carbonate is preferably used because it is decarbonized by sensible heat in the rotary kiln 41 and is easily decomposed into calcium oxide (CaO) and carbon dioxide ($CO_2$).

Radioactive cesiums included in the inorganic matter S4 and the organic matter O3 volatilize in the rotary kiln 41 and are introduced into the cooling tower 51 with being included in the exhaust gas G1.

In the cooling tower 51, the exhaust gas G1 is rapidly cooled with a water splayed from the spraying device 51a (or a cooling air introduced into the cooling tower, or a mixture of them), and cesium included in the exhaust gas G1 becomes solid cesium salt to adhere to dust.

Next, the exhaust gas G2 from the cooling tower 51 that includes the cesium salt is introduced into the cyclone 52 to recover the coarse dust C included in the exhaust gas G2. The recovered coarse dust C is returned to the rotary kiln 41. This coarse dust C includes cesium salt also, but content rate thereof is low, so that it is returned to the rotary kiln 41 to recover the cesium after revolatilization.

The exhaust gas G3 from the cyclone 52 is introduced into the bag filter 53, and the fine dust F that includes cesium salt at high rates is recovered. After treated with washing, adsorption, compression etc. to reduce volume thereof as occasion demands, the fine dust F is stored in concrete vessels or the like at sealed state, and is transported to an interim storage facility or a final disposal site. In addition, dust adsorbing acid gases etc. that is included in the exhaust gas G3 is also recovered by the bag filter 53.

The exhaust gas G4 from the bag filter 53 is introduced into the denitrification scrubber 54, and NOx included in the exhaust gas G4 is removed by decomposing it. Then, a cleaned exhaust gas G5 from the denitrification scrubber 54 is discharged to an atmosphere through the stack 55.

On the other hand, the inorganic matter S4 thrown into the rotary kiln 41 is burnt in the rotary kiln 41 by combustion heats of the fossil fuel F1 and the organic matter O3 blown from the burner 41b, and after radioactive cesium is removed by volatilization, the burnt material is cooled in the clinker cooler 42, and the clinker (decontaminated product) P1 usable as earthwork materials etc. is generated. The high-temperature extracted gas H from the clinker cooler 42 is used as heat sources for the dryer 21 of the organic matter and the dryer 32 of the inorganic matter.

The decontaminated product P1 is separated by the separator 61 to become usable particle sizes as earthwork materials etc., and further the insolubilizing material Q is added to the decontaminated product P2 to mix them in the insolubilizing material supplying/mixing device 62. As a method of mixing the decontaminated product P2 and the insolubilizing material Q with each other, the decontaminated product P2 and a powder insolubilizing material Q may be mixed with each other, or after the insolubilizing material Q is mixed to a water so as to be a slurry or an aqueous solution (hereinafter, referred to as "slurry etc." also), slurry etc. can be mixed/splayed to the decontaminated product P2, or the decontaminated product P2 may dip into the slurry etc.

As described above, with the present embodiment, radioactive cesiums are effectively removed from the organic matter O1 and the inorganic matter S1 including radioactive cesium at low cost, and these are used for fuels and raw materials, which enable manufacture of decontaminated product P3 available as cement admixtures and earthwork materials etc.

In addition, in the above embodiment, although the cyclone 52 is installed in a fore stage of the bag filter 53 and the coarse dust C is separated and is returned to the rotary kiln 41, it is possible that all of the dust included in the exhaust gas G2 from the cooling tower 51 is recovered, and after all of the dust recovered is reduced in volume, they can be transported to interim storage facilities or final disposal sites.

Further, although the inorganic matter S4 and the reaction accelerant A are supplied from the charging port 41a in a mixed state into the rotary kiln 41, each of them can be thrown solely. In addition, about the throwing position also, they can be thrown from an inlet end portion into the rotary kiln 41, and the throwing position is not limited to the charging port 41a. Further, about the organic matter O3 also, it can be thrown through a kiln outlet portion into the rotary kiln 41, the throwing position is not limited to the burner 41b.

EXPLANATION OF REFERENCE NUMBERS 1 removal device for radioactive cesium
2 organic matter drying/crushing device
21 dryer
22 crusher
3 inorganic matter reforming/drying/crushing device
31 reformer
32 dryer
33 crusher
4 burning device
41 rotary kiln
41a inorganic matter charging port
41b burner
42 clinker cooler
5 decontamination system exhaust gas treatment device
51 cooling tower
51a spraying device
52 cyclone
53 bag filter
54 denitrification scrubber
55 stack
6 decontaminated product separator
61 separator
62 insolubilizing material supplying/mixing device
A reaction accelerant (calcium source)
B reformer
C coarse dust
F fine dust
O1-O3 organic matters (contaminated with radioactive cesium)
F1 fossil fuel
G1-G5 exhaust gases
H extracted gas from clinker cooler
P1 clinker (decontaminated product)
P2 decontaminated product
P3 earthwork materials etc. (decontaminated product)
Q insolubilizing material
S1-S4 inorganic matters (contaminated with radioactive cesium)
T reformer

The invention claimed is:

1. A removal device for radioactive cesium comprising:
   organic matter supplying means for supplying an organic matter contaminated with radioactive cesium from a kiln outlet;
   inorganic matter supplying means for supplying an inorganic matter contaminated with radioactive cesium from a kiln inlet;
   a rotary kiln for burning the organic matter together with the inorganic matter; and
   a recovery device for recovering cesium volatilizing in the rotary kiln.

2. The removal device for radioactive cesium as claimed in claim 1, wherein the rotary kiln is adapted to receive a calcium source when the organic matter contaminated with radioactive cesium is burnt together with the inorganic matter contaminated with radioactive cesium.

3. The removal device for radioactive cesium as claimed in claim 1, further comprising: a separator for separating a decontaminated product generated after radioactive cesium is volatilized and removed in the rotary kiln; and an insolubilizing material supplying/mixing device for supplying an insolubilizing material to the decontaminated product and mixing them.

4. A removal device for radioactive cesium comprising:
an organic matter supplier configured to supply an organic matter contaminated with radioactive cesium from a kiln outlet;
an inorganic matter supplier configured to supply an inorganic matter contaminated with radioactive cesium from a kiln inlet;
a rotary kiln for burning the organic matter together with the inorganic matter; and
a recovery device configured to recover cesium volatilizing in the rotary kiln.

5. The removal device for radioactive cesium as claimed in claim 4, wherein the organic matter supplier includes a drying/crushing device for drying and crushing said organic matter contaminated with radioactive cesium before thrown into the rotary kiln.

6. The removal device for radioactive cesium as claimed in claim 5, wherein the inorganic matter supplier includes a reformer for reforming said inorganic matter contaminated with radioactive cesium before thrown into the rotary kiln.

7. The removal device for radioactive cesium as claimed in claim 5, wherein the inorganic matter supplier includes a drying/crushing device for drying and crushing said inorganic matter contaminated with radioactive cesium before thrown into the rotary kiln.

8. The removal device for radioactive cesium as claimed in claim 5, wherein said recovery device includes a cooling tower for cooling an exhaust gas from the rotary kiln, and a dust collector for collecting dust in an exhaust gas from the cooling tower.

9. The removal device for radioactive cesium as claimed in claim 8, further comprising a classifier, in a fore stage of the dust collector, for separating a coarse dust in the exhaust gas from the cooling tower, wherein said coarse dust separated by the classifier is returned to the rotary kiln.

10. The removal device for radioactive cesium as claimed in claim 5, further comprising: a separator for separating a decontaminated product generated after radioactive cesium is volatilized and removed in the rotary kiln; and an insolubilizing material supplying/mixing device for supplying an insolubilizing material to the decontaminated product and mixing them.

11. The removal device for radioactive cesium as claimed in claim 4, wherein the inorganic matter supplier includes a reformer for reforming said inorganic matter contaminated with radioactive cesium before thrown into the rotary kiln.

12. The removal device for radioactive cesium as claimed in claim 11, wherein said recovery device includes a cooling tower for cooling an exhaust gas from the rotary kiln, and a dust collector for collecting dust in an exhaust gas from the cooling tower.

13. The removal device for radioactive cesium as claimed in claim 12, further comprising a classifier, in a fore stage of the dust collector, for separating a coarse dust in the exhaust gas from the cooling tower, wherein said coarse dust separated by the classifier is returned to the rotary kiln.

14. The removal device for radioactive cesium as claimed in claim 11, further comprising: a separator for separating a decontaminated product generated after radioactive cesium is volatilized and removed in the rotary kiln; and an insolubilizing material supplying/mixing device for supplying an insolubilizing material to the decontaminated product and mixing them.

15. The removal device for radioactive cesium as claimed in claim 4, wherein the inorganic matter supplier includes a drying/crushing device for drying and crushing said inorganic matter contaminated with radioactive cesium before thrown into the rotary kiln.

16. The removal device for radioactive cesium as claimed in claim 15, wherein said recovery device includes a cooling tower for cooling an exhaust gas from the rotary kiln, and a dust collector for collecting dust in an exhaust gas from the cooling tower.

17. The removal device for radioactive cesium as claimed in claim 16, further comprising a classifier, in a fore stage of the dust collector, for separating a coarse dust in the exhaust gas from the cooling tower, wherein said coarse dust separated by the classifier is returned to the rotary kiln.

18. The removal device for radioactive cesium as claimed in claim 15, further comprising: a separator for separating a decontaminated product generated after radioactive cesium is volatilized and removed in the rotary kiln; and an insolubilizing material supplying/mixing device for supplying an insolubilizing material to the decontaminated product and mixing them.

19. The removal device for radioactive cesium as claimed in claim 4, wherein said recovery device includes a cooling tower for cooling an exhaust gas from the rotary kiln, and a dust collector for collecting dust in an exhaust gas from the cooling tower.

20. The removal device for radioactive cesium as claimed in claim 19, further comprising a classifier, in a fore stage of the dust collector, for separating a coarse dust in the exhaust gas from the cooling tower, wherein said coarse dust separated by the classifier is returned to the rotary kiln.

21. The removal device for radioactive cesium as claimed in claim 19, further comprising: a separator for separating a decontaminated product generated after radioactive cesium is volatilized and removed in the rotary kiln; and an insolubilizing material supplying/mixing device for supplying an insolubilizing material to the decontaminated product and mixing them.

* * * * *